US006456934B1

(12) United States Patent
Matsunaga et al.

(10) Patent No.: US 6,456,934 B1
(45) Date of Patent: Sep. 24, 2002

(54) VEHICLE-MOUNTED NAVIGATION SYSTEM, AND RECORDING MEDIUM HAVING RECORDED THEREON A PROCESSING PROGRAM FOR USE THEREWITH

(75) Inventors: Takayuki Matsunaga; Ryo Wada, both of Shizuoka (JP)

(73) Assignee: Yazaki Corporation, Shizuoka (JP)

( * ) Notice: Subject to any disclaimer, the term of this patent is extended or adjusted under 35 U.S.C. 154(b) by 0 days.

(21) Appl. No.: 09/689,737

(22) Filed: Oct. 13, 2000

(30) Foreign Application Priority Data

Oct. 14, 1999 (JP) .......................................... 11-292540

(51) Int. Cl.[7] ......................... G08G 1/0969; G08G 1/09

(52) U.S. Cl. ....................................... 701/210; 701/201

(58) Field of Search ................................ 701/201, 209, 701/210, 211; 340/995

(56) References Cited

U.S. PATENT DOCUMENTS

| | | | | |
|---|---|---|---|---|
| 5,243,528 A | * | 9/1993 | Lefebvre | 340/990 |
| 5,928,307 A | * | 7/1999 | Oshizawa et al. | 340/995 |
| 5,991,688 A | * | 11/1999 | Fukushima et al. | 701/201 |
| 6,118,389 A | * | 9/2000 | Kamada et al. | 340/995 |
| 6,321,161 B1 | * | 11/2001 | Herbst et al. | 340/905 |

* cited by examiner

*Primary Examiner*—Michael J. Zanelli
(74) *Attorney, Agent, or Firm*—Morgan, Lewis & Bockius LLP

(57) ABSTRACT

A computation section (12), of a vehicle-mounted navigation system (1), which includes: a detour request receiving device (21) which receives a detour request entered by the vehicle's driver; a final-point-of-detour receiving device (22) which receives, as a final point of detour, a final point of a segment around which the driver requests to make a detour; an alternative path search device (23) which retrieves alternative paths interconnecting the current position of a vehicle and the final point of detour; and a detour link device (24) which links the final point of detour to the original route.

6 Claims, 9 Drawing Sheets

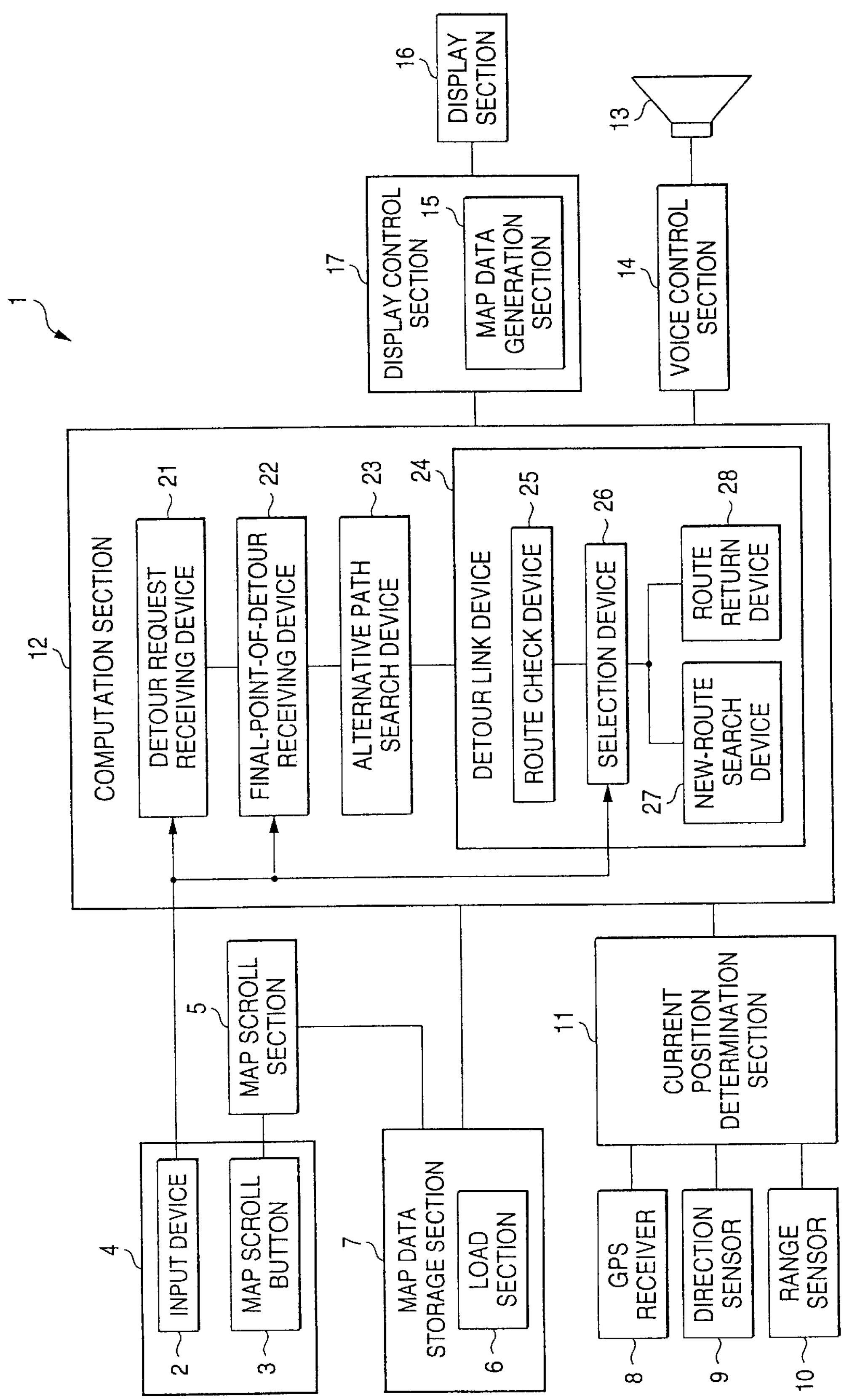
FIG. 1
1
12
COMPUTATION SECTION
21
DETOUR REQUEST RECEIVING DEVICE
22
FINAL-POINT-OF-DETOUR RECEIVING DEVICE
23
ALTERNATIVE PATH SEARCH DEVICE
24
DETOUR LINK DEVICE
25
ROUTE CHECK DEVICE
26
SELECTION DEVICE
27
NEW-ROUTE SEARCH DEVICE
28
ROUTE RETURN DEVICE
17
DISPLAY CONTROL SECTION
15
MAP DATA GENERATION SECTION
16
DISPLAY SECTION
14
VOICE CONTROL SECTION
13
4
INPUT DEVICE
2
MAP SCROLL BUTTON
3
5
MAP SCROLL SECTION
7
MAP DATA STORAGE SECTION
LOAD SECTION
6
11
CURRENT POSITION DETERMINATION SECTION
GPS RECEIVER
8
DIRECTION SENSOR
9
RANGE SENSOR
10

DESTINATION D
IN THE CASE OF DETOUR SEARCH WHICH DOES NOT ENABLE SELECTION OF FINAL POINT OF DETOUR, ALTERNATIVE PATH IS PREPARED AUTOMATICALLY
SEARCH ALTERNATIVE ROUTE TO THE FINAL POINT G OF DETOUR
R1
LOCATION SET AS THE FINAL POINT G OF DETOUR
R
CURRENT POSITION S
M
ORIGINAL ROUTE
INTERCONNECT CURRENT POSITION TO ORIGINAL ROUTE

EXAMPLE 1: SEARCH NEW ROUTE

EXAMPLE 1: RETURN VEHICLE TO ORIGINAL PATH

DESTINATION D
R2
R1
CURRENT POSITION S
M
R
ORIGINAL ROUTE

VEHICLE-MOUNTED NAVIGATION SYSTEM, AND RECORDING MEDIUM HAVING RECORDED THEREON A PROCESSING PROGRAM FOR USE THEREWITH

BACKGROUND OF THE INVENTION

1. Field of the Invention

The present invention relates to a vehicle navigation system for guiding a vehicle to a destination. More particularly, the present invention relates to a vehicle-mounted navigation system which enables a driver arbitrarily to set an alternative path for making a detour to thereby avoid a congested road segment. Further, the present invention relates to a recording medium, such as a computer readable medium, having recorded thereon a processing program for use with the vehicle-mounted navigation system.

The present application is based on Japanese Patent Application No. Hei. 11-292540, which is incorporated herein by reference.

2. Description of the Related Art

When a driver considers making a detour from an initially-set route-in order to avoid traffic congestion or to comply with traffic regulations-and searches for an alternative path by using a related vehicle-mounted navigation system (as developed by Yazaki corporation of Japan), the navigation system retrieves a plurality of alternative paths and displays the thus-retrieved alternative paths. The driver then selects a desired one from the alternative paths and drives his car along the thus-selected alternative path.

Retrieval of an alternative path, as performed by the related vehicle-mounted navigation system, will now be described with reference to a flowchart shown in FIG. 7.

As shown in FIG. 7, the related navigation system retrieves an alternative path by the steps of: receiving a detour request from a driver (S701), retrieving a plurality of routes as alternative paths through a detour search operation (S702), displaying the thus-retrieved alternative paths (S703), allowing the driver to select an optimal alternative path (S704), and commencing guidance of a vehicle along the thus-selected alternative path (S705).

Two methods have hitherto been conceived as correction methods when a vehicle deviates from an initially-set route. One method retrieves a new route to the destination by neglecting the initial route, as shown in FIG. 8A. Another method guides the vehicle back to the initially-set route, as shown in FIG. 8B.

The related vehicle-mounted navigation system employs only one or the other of the two above-described correction methods in order to guide a vehicle when the vehicle deviates from an initially-set route.

However, when the related navigation system retrieves an alternative path, it does not allow a driver arbitrarily to set a desired alternative path. Thus, the related vehicle-mounted navigation system cannot retrieve an alternative path that takes into consideration a detour segment desired by the driver. For instance, when a vehicle is driving at a current position S, as shown in FIG. 9, if the driver considers a segment M of an initially-set route R to be non-navigable, for reasons of congestions or traffic regulations, he enters a detour request to the navigation system. Upon receipt of the detour request, the navigation system per se retrieves a plurality of alternative paths, and the driver can select one of those alternative paths.

Perhaps, even when the driver desires to drive his car along a route R1 to make a detour avoiding only a segment M, there is no alternative but to select a route R2 which makes a long detour.

In connection with a method of correcting the course of a vehicle when the vehicle deviates from an initially-set route, a related vehicle-mounted navigation system is provided with only one of the two correction methods: 1) a method of searching for a new route to the destination, as shown in FIG. 8A; and 2) a method of searching for a route which returns the vehicle to the initial route, as shown in FIG. 8B. When a driver desires to use a particular method of searching for a new route, there may be available only a method of searching for a path that returns the vehicle to the initial route. Alternatively, when a driver desires to use one of the two correction methods, depending on his circumstances, only one correction method is available in the related navigation system.

SUMMARY OF THE INVENTION

The present invention has been conceived in light of the foregoing circumstance, and is aimed at providing a vehicle-mounted navigation system which enables a user arbitrarily to set an alternative path to avoid a congested road segment. Further, the present invention is aimed at providing a recording medium, such as a computer readable medium, having recorded thereon a processing program for use with the navigation system.

The present invention provides a vehicle-mounted navigation system which detects the current position of a vehicle, searches for a route to a set destination, and guides the vehicle along the thus-retrieved route, the system including:

- an input device which enables a user to enter commands;
- a detour request receiving device connected to said input device, wherein said detour request receiving device receives a detour request entered from the input device by the user;
- a final-point-of-detour receiving device connected to the detour request receiving device, wherein said final-point-of-detour receiving device receives the final point of a segment around which the user requests to make a detour and sets the final point as a final point of detour, after having received the detour request;
- an alternative path search device connected to said final-point-of-detour receiving device, wherein said alternative path search device searches for an alternative path interconnecting the current position of the vehicle to the final point of detour, after having received the final point of detour; and
- a detour link device which interconnects the final point of the detour to the destination, or to an original route.

According to the present invention, the user can specify the final point of detour and, hence, arbitrarily can set an alternative path.

Preferably, the detour link device further includes:

- a detour check device which, by comparison, checks whether or not a match exists between the final point of detour and the original route;
- a selection device which, when the detour check device has detected no match, determines whether to search for a new route interconnecting the final point of detour to the destination, or to search for a path which returns the vehicle to the original route, in accordance with settings made by the user;
- a new-route search device which, when the selection device has selected to search for a new route to the destination, searches a new route interconnecting the final point of detour to the destination; and a route return device which, when the selection device has selected return of the vehicle to the original route, searches for a route that returns the vehicle from the final point of detour to the original route.

According to the present invention, the user can determine whether to search for a new route interconnecting the final point of detour to a destination, or to search for a route which returns the vehicle to the original route. The user can set either alternative path in accordance with the user's desire.

The present invention also provides a vehicle-mounted navigation system which detects the current position of a vehicle, searches for a route to a set destination, and guides the vehicle along the thus-retrieved route, the system including:

a detour check device which, by comparison, checks whether or not a match exists between the final point of detour and the original route;

a selection device which, when the detour check device has detected no match, determines whether to search for a new route interconnecting the final point of detour to the destination, or to search for a path which returns the vehicle to the original route, in accordance with settings made by the user;

a new-route search device which, when the selection device has selected to search for a new route to the destination, searches a new route interconnecting the final point of detour to the destination; and a route return device which, when the selection device has selected return of the vehicle to the original route, searches for a route that returns the vehicle from the final point of detour to the original route.

According to the present invention, when the vehicle deviates from the original route, the user can determine whether to search for a new route interconnecting the current position to the destination, or to search for a route which returns the vehicle to the original route. The user can set either alternative path in accordance with the user's desire.

The present invention provides a recording medium, such as a computer readable medium, having recorded thereon a processing program for use with a vehicle-mounted navigation system which detects the current position of a vehicle, searches for a route to a set destination, and guides the vehicle along the thus-retrieved route, the processing program including:

a detour request receiving operation for receiving a detour request entered by a user;

a final-point-of-detour receiving operation which receives, from the detour request receiving operation, a final point of a segment around which the user requests to make a detour, and which sets the final point as a final point of detour;

an alternative path search operation which receives the final point of detour from the final-point-of-detour receiving operation, and which searches for an alternative path interconnecting the current position of the vehicle to the final point of detour, after having received the final point of detour; and a detour link operation which interconnects the final point of detour to the destination, or to an original route.

The user can specify the final point of the detour and, hence, can arbitrarily set an alternative path.

Preferably, the route link operation further includes:

a detour check operation which, by comparison, checks whether or not a match exists between the final point of detour and the original route;

a selection operation which, when the route check operation has detected no match, determines whether to search for a new route interconnecting the final point of detour to the destination, or to search for a route which returns the vehicle to the original route, in accordance with settings made by the user;

a new-route search operation which, when the selection operation has determined to search for a new route to the destination, searches for a new route interconnecting the final point of detour to the destination; and a route return operation which, when the selection operation has selected return of the vehicle to the original route, searches for a route that returns the vehicle from the final point of detour to the original route.

According to the present invention, the user can determine whether to search for a new route interconnecting the final point of detour to a destination, or to search for a route which returns the vehicle to the original route. The user can set either alternative path in accordance with user's desire.

The present invention also provides a recording medium, such as a computer readable medium, having recorded thereon a processing program for use with a vehicle-mounted navigation system which detects the current position of a vehicle, searches for a route to a set destination, and guides the vehicle along the thus-retrieved route, the processing program including:

a detour check operation which, by comparison, checks whether or not a match exists between the final point of detour and the original route;

a selection operation which, when the route check operation has detected no match, determines whether to search for a new route interconnecting the final point of detour to the destination, or to search for a route which returns the vehicle to the original route, in accordance with settings made by the user;

a new-route search operation which, when the selection operation has determined to search for a new route to the destination, searches for a new route interconnecting the final point of detour to the destination; and a route return operation which, when the selection operation has selected return of the vehicle to the original route, searches for a route that returns the vehicle from the final point of detour to the original route.

According to the present invention, when the vehicle deviates from the original route, the user can determine whether to search for a new route interconnecting the current position to the destination, or to search for a route which returns the vehicle to the original route. The user can set either alternative path in accordance with the user's desire.

BRIEF DESCRIPTION OF THE DRAWINGS

FIG. 1 is a block diagram showing the configuration of a vehicle-mounted navigation system according to a first embodiment of the present invention;

DETAILED DESCRIPTION OF THE PREFERRED EMBODIMENTS

Figure 2:
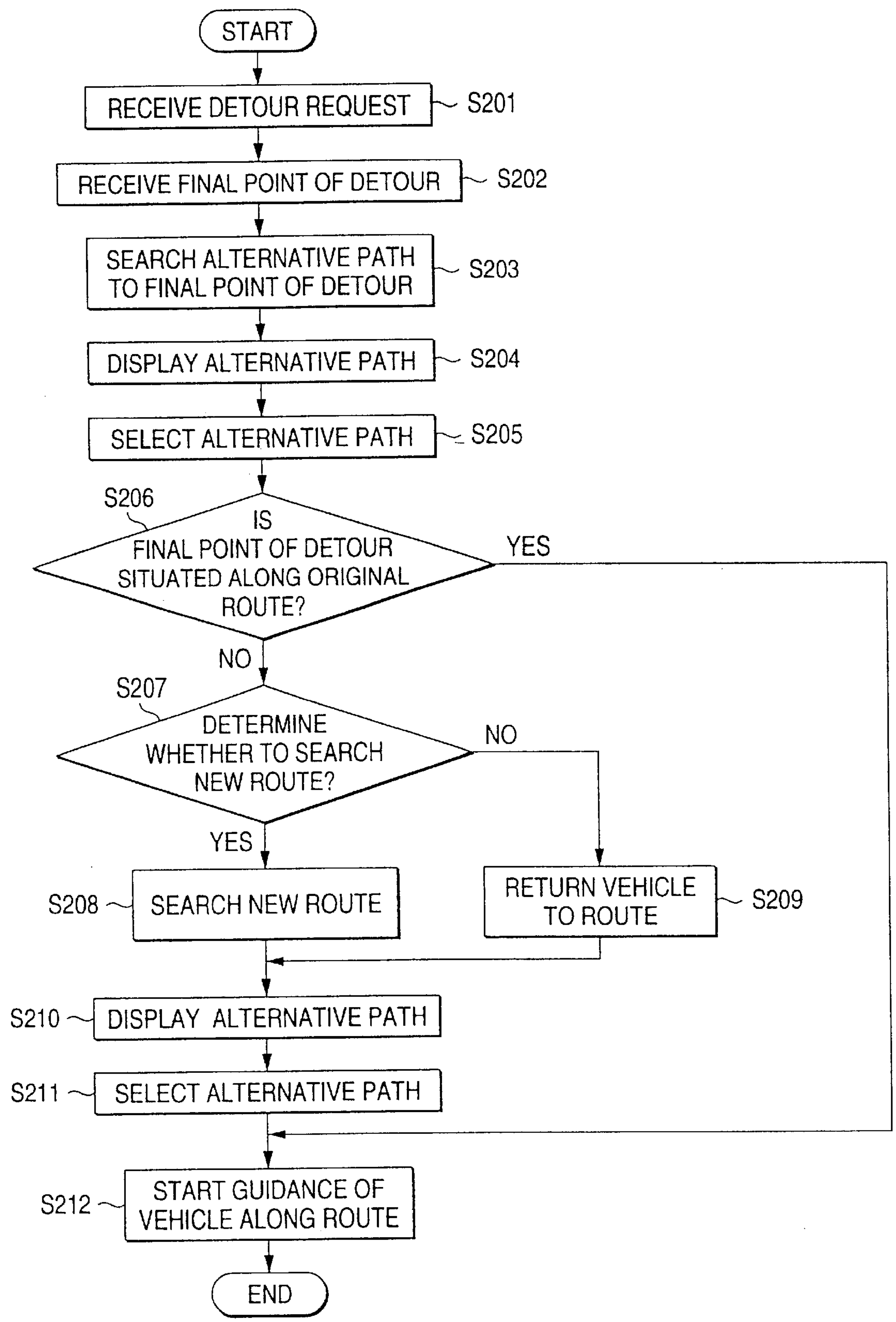
FIG. 2 is a flowchart for describing retrieval of an alternative path performed by the vehicle-mounted navigation system according to the first embodiment shown in FIG. 1.
Figure 3:
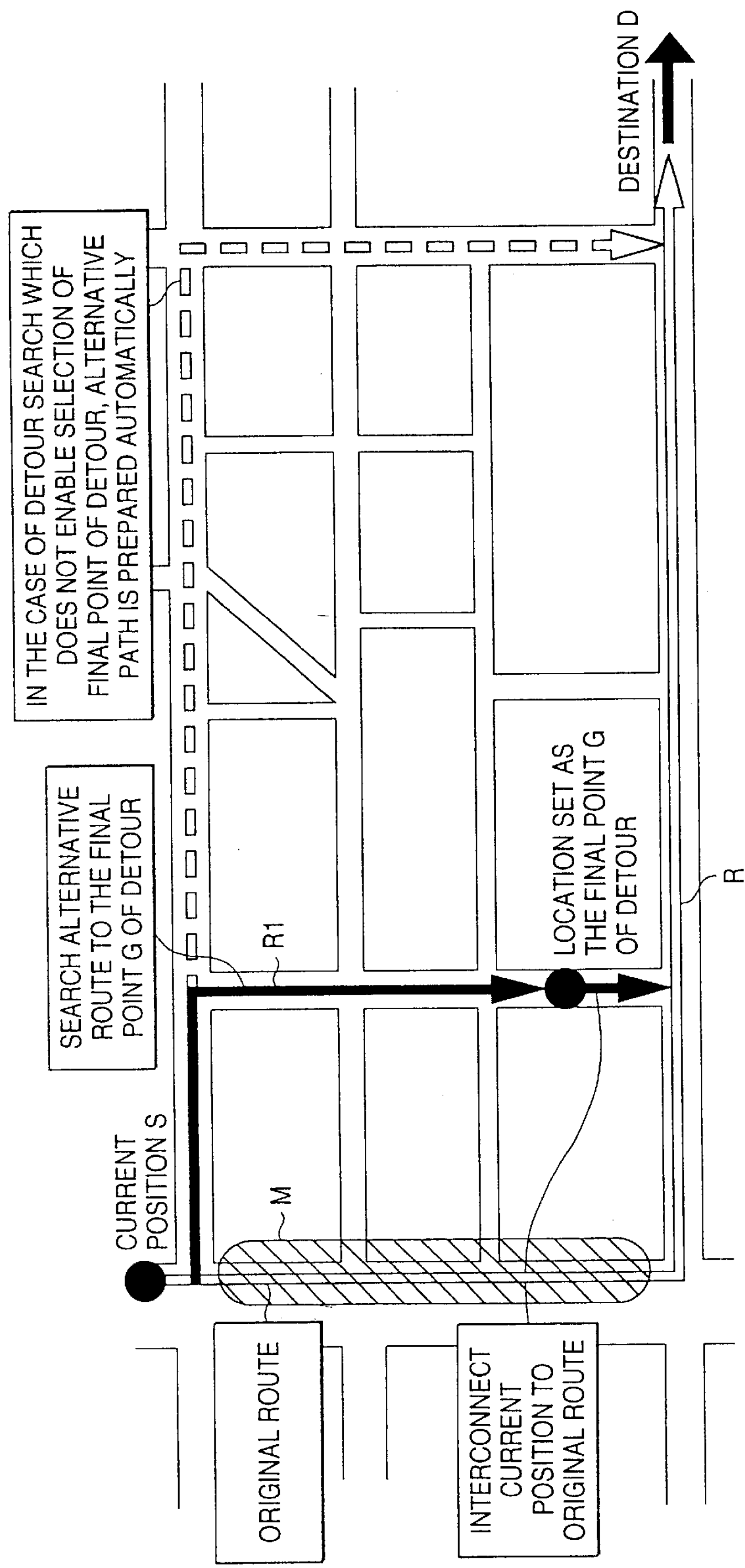
FIG. 3 is an illustration for describing retrieval of an alternative path performed by the vehicle-mounted navigation system according to the first embodiment.

A vehicle-mounted navigation system and a recording medium, such as a computer readable medium, having recorded thereon a processing program for use with the vehicle-mounted navigation system according to the present invention will be described hereinbelow by reference to the accompanying drawings.

1. First Embodiment

A hardware configuration of a vehicle-mounted navigation system according to a first embodiment of the present invention will now be described by reference to FIG. 1.

As shown in FIG. 1, a vehicle-mounted navigation system according to the present embodiment includes: an operation section 4 having an input device 2 and a map scroll button 3. A driver operates the input device 2 to enter a detour request and the final point of a detour. The driver also uses the map scroll button 3 to enter an instruction for scrolling a map. The navigation system also includes a map scroll section 5, for scrolling a map when the map scroll button 3 is actuated, and a map data storage section 7. The map data storage section 7 has recorded thereon navigation data required for computing a route and guide data required for guiding a vehicle. Further, the map data storage section 7 includes a load section 6 for loading the data in accordance with an instruction issued by the map scroll section 5.

Further, the navigation system of the present invention includes a current position determination section 11 which determines the current position of a vehicle upon receipt of information from a GPS receiver 8, a direction sensor 9, and a range sensor 10.

Moreover, the navigation system of the present invention includes a computation section 12, an audio control section 14, and a map display control section 17. The computation section 12 controls the entire navigation system and performs a computation for retrieving an alternative path. The audio control section 14 converts audio data into an analog signal in accordance with a guide instruction output from the computation section 12, and outputs a guide voice by activating a loudspeaker 13. The map display control section 17 includes a data generation section 15 for producing a detour set screen and a route guide screen. The display control section 17 then outputs a signal for displaying a screen on a display section 16.

The computation section 12 further comprises a detour request receiving device 21, a final-point-of-detour receiving device 22, an alternative path search device 23, and a detour link device 24.

The detour request receiving device 21 receives a detour request entered by the vehicle' driver, or other user. The final-point-of-detour receiving device 22 receives, as a final point of detour, a final point of a segment around which the driver requests to make a detour. The alternative path search device 23 retrieves alternative paths interconnecting the current position of the vehicle and the final point of detour. And the detour link device 24 links the final point of detour to an original route (i.e., a route set before a detour is made).

The detour link device 24 further includes a route check device 25, a selection device 26, a new-route search device 27, and a route return device 28. The route check device 25 checks, by comparison, whether a match exists between the final point of detour and the original route. When the route check device 25 detects no match, the selection device 26 searches for a new path from the final point of detour to a destination, or for a path which returns the vehicle to the original route, in accordance with settings which have been previously made by the driver. The new-route search device 27 searches for a new route from the final point of detour to the destination, when the selection device 26 has selected search of a new route to the destination. And the route return device 28 searches for a path which returns the vehicle from the final point of detour to the original route, when the selection device 26 has selected return of the vehicle to the original route.

The computation section 12 includes an ordinary computer system having a CPU for performing various processing operations and a storage device which stores instructions regarding the processing operations. Processing instructions and timing restrictions for the detour request receiving device 21, those for the final-point-of-detour receiving device 22, those for the alternative path search device 23, and those for the detour link device 24 are retained in the storage device, when the detour request receiving device 21, the final-point-of-detour receiving device 22, the alternative path search device 23, and the detour link device 24 are included in the computing section 12. The processing instructions and timing restrictions are loaded to and executed by the CPU, as required.

Next will be described, in accordance with the flowchart shown in FIG. 2, retrieval of an alternative path performed by the vehicle-mounted navigation system according to the present embodiment.

When a driver considers a segment M of an initially-set route R to be difficult to travel, because of congestion or traffic regulations, for example, and desires to make a detour while driving his vehicle at a current position S, the driver enters a detour request by operating the input device 2 of the operation section 4 (S201). When the detour request receiving device 21 receives the detour request, the driver enters a final point G of the detour by operating the input device 2 (S202). Alternatively, the driver can enter, on a map, the final point G of the detour by touching the display section 16 appearing on a route screen. However, when a point desired to be input as the final point of detour does not appear on the display section 16, a map appearing on the display section 16 is scrolled by operating the map scroll button 3, thereby enabling the driver to enter the final point G by displaying a desired point on the display section 16.

When the final point G of the detour is input to the final-point-of-detour receiving device 22, the alternative path search device 23 searches a route R1 interconnecting the current position S of the vehicle and the final point G (S203). The map data generation section 15 produces a guide screen, to thereby display the thus-searched route R1 on the display section 16 (S204). When a plurality of routes are searched, the thus-searched routes are displayed. The driver selects the route R1 from among the routes (S205).

Figure 4:
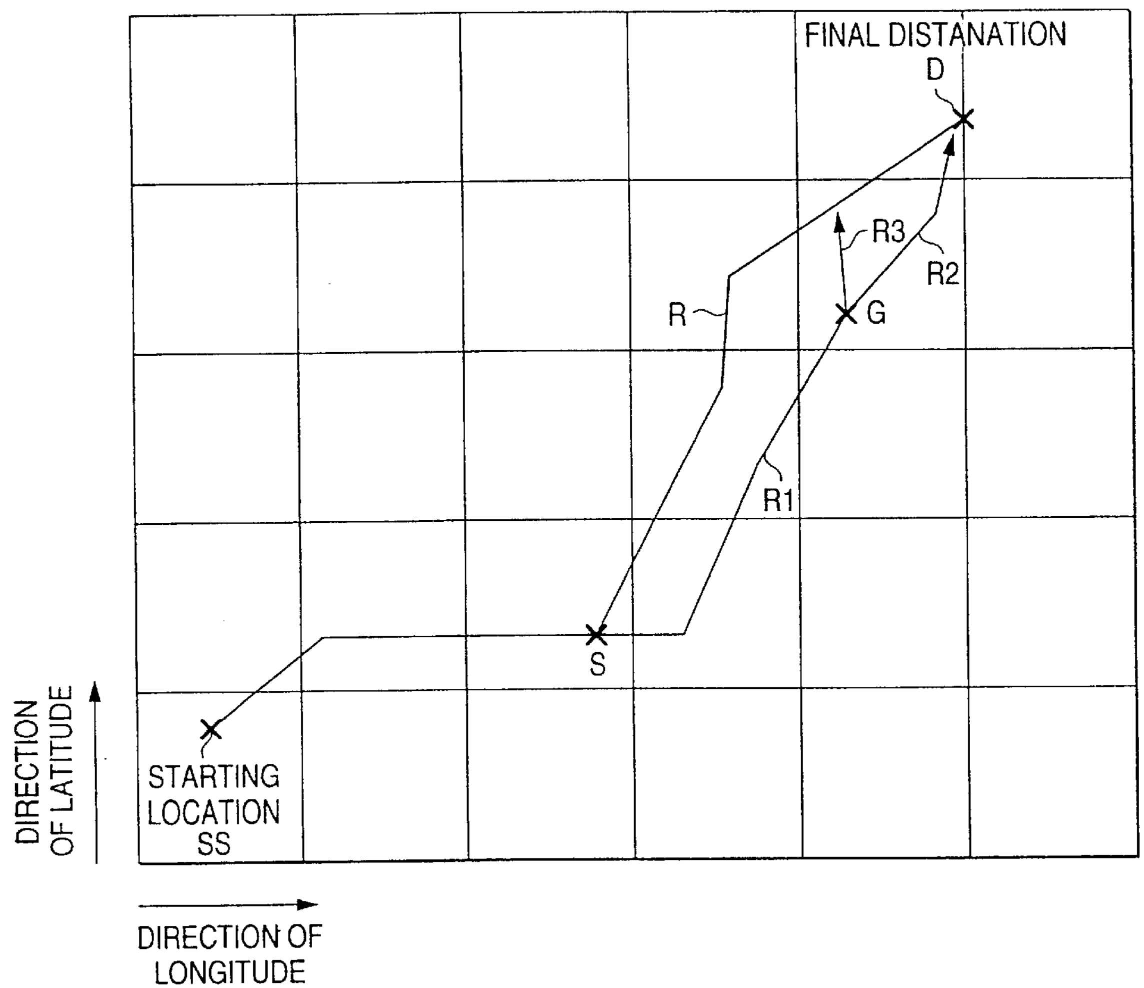
FIG. 4 is an illustration for describing linkage of the current position of a vehicle to a destination performed by the vehicle-mounted navigation system according to the first embodiment.

The detour link device 24 links the final point G of the detour to a destination D or to the route R that has been set before the detour was made (i.e., the original route). The route check device 25 checks whether or not the final point G of the detour is located along the original route R (S206). If the final point G is located along the original route R, processing proceeds to step S212, where guidance along a detour is commenced. In contrast, if the final point G of the detour is not located along the original route R, the selection device 26 determines whether to search for a new route to the destination D, or to search for a route which returns the vehicle to the original route R, in accordance with the settings which have been entered by the driver beforehand (S207). When search of a new route is selected, the new-route search device 27 searches for a new route interconnecting the final point G to the destination D in the manner as shown in FIG. 4, thus retrieving a route R2 (S208). When return of a vehicle to the original route R is selected, the route return device 28 searches for a route R3 which returns a vehicle from the final point G of the detour to the original route R (S209).

The map data generation section 15 then generates a guide screen (S210), which appears on the display screen 16, displaying the route R2 searched by the new-route search device 27 or displaying the route R3 searched by the route return device 28. If a plurality of alternative paths have been searched, the thus-searched paths are displayed together. The driver selects one of the alternative paths (S211), whereupon guidance along that alternative path is commenced (S212).

As mentioned above, the vehicle-mounted navigation system according to the present embodiment enables a driver to specify the final point of a detour. Accordingly, the driver arbitrarily can set a detour.

Further, the driver can determine whether to search for a new route from the final point of the detour to the destination, or to search for a route which returns a vehicle to the original route. Accordingly, the driver can set a detour in accordance with his desire.

2. Second Embodiment

A vehicle-mounted navigation system according to a second embodiment of the present invention will now be described.

Figure 5:
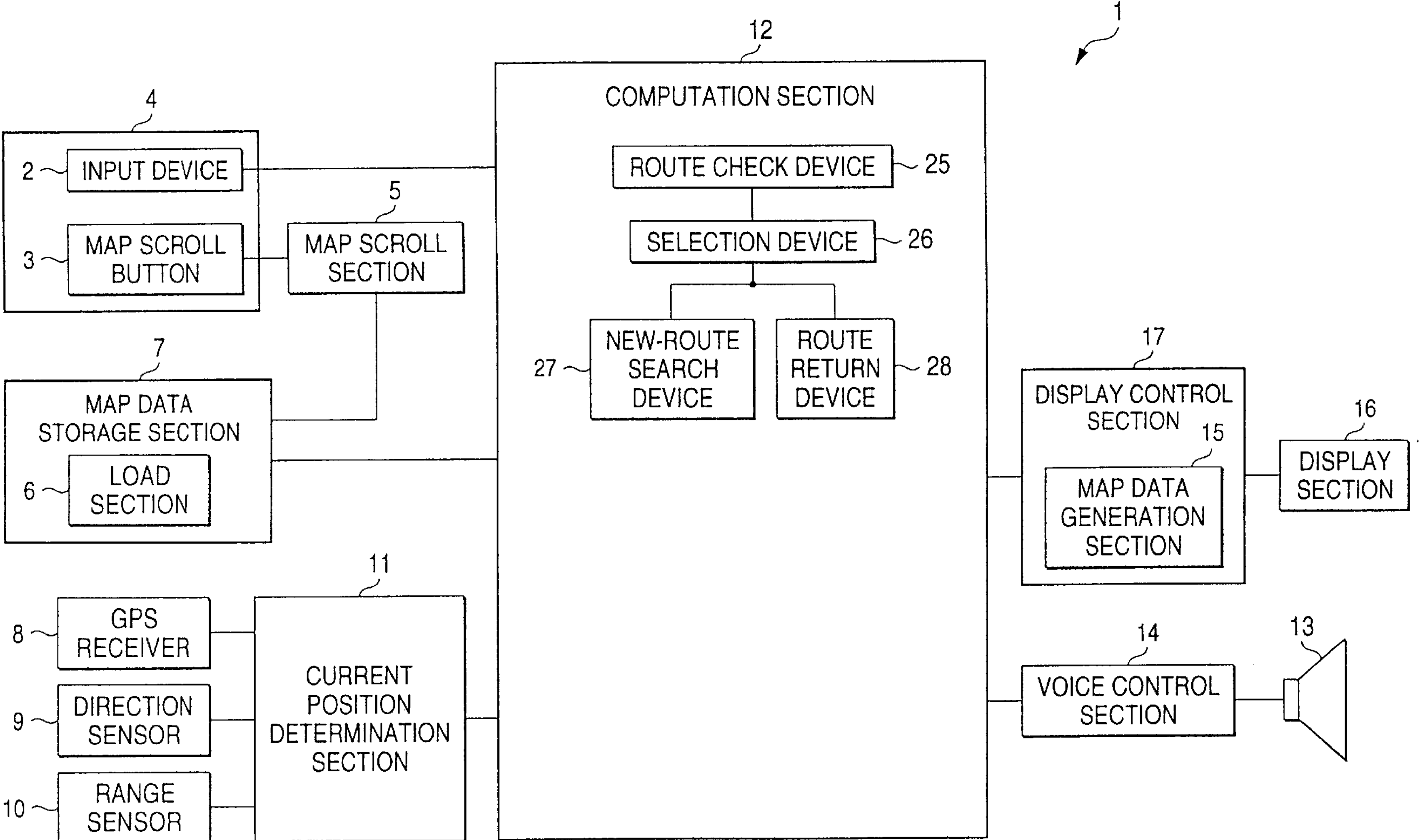
FIG. 5 is a block diagram showing the configuration of a vehicle-mounted navigation system according to a second embodiment of the present invention.

As shown in FIG. 5, a hardware configuration of the vehicle-mounted navigation system according to the second embodiment is identical with that of the vehicle-mounted navigation system described in connection with the first embodiment and, hence, repetition of its description is omitted here.

The configuration of the computing section 12, however, is different from that of the first embodiment. In the second embodiment, the computing section 12 includes a route check device 25, a selection device 26, a new-route search device 27, and a route return device 28. The route check device 25 checks, by comparison, whether a match exists between the current position of a vehicle and the original route. If the route check device 25 detects no match, the selection device 26 searches for a new path from the current position to the destination, or searches for a path which returns the vehicle to the original route, in accordance with settings which have been previously made by the driver. The new-route search device 27 searches for a new path, from the current position to the destination, when the selection device 26 has selected search of a new path to the destination. And the route return device 28 searches for a path which returns the vehicle from the final point of detour to the original route, when the selection device 26 has selected return of the vehicle to the original route.

Figure 6:
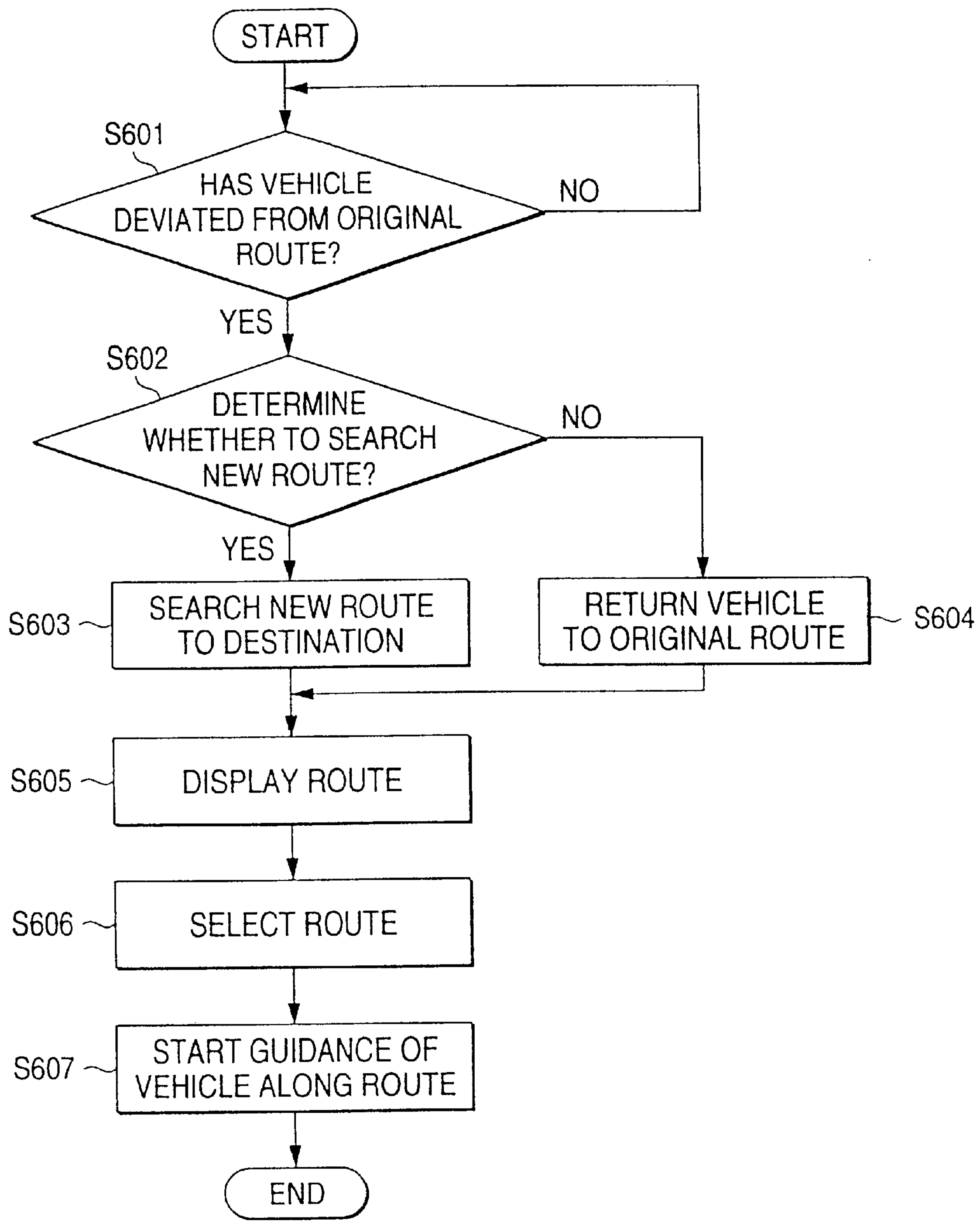
FIG. 6 is a flowchart for describing retrieval of an alternative path performed by the vehicle-mounted navigation system according to the second embodiment shown in FIG. 5.
Figure 7:
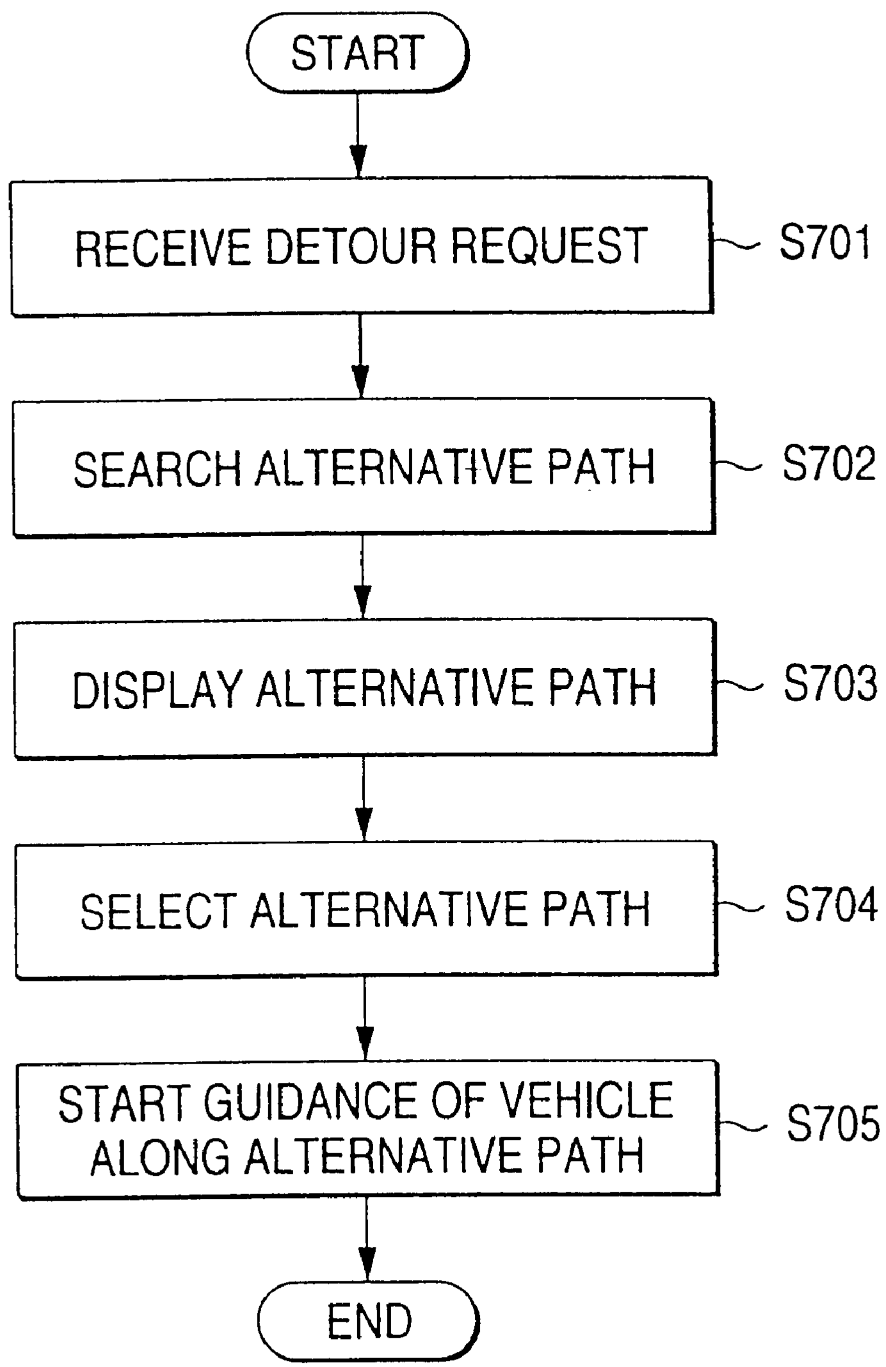
FIG. 7 is a flowchart for describing retrieval of an alternative path performed by a related vehicle-mounted navigation system.
Figure 8A:
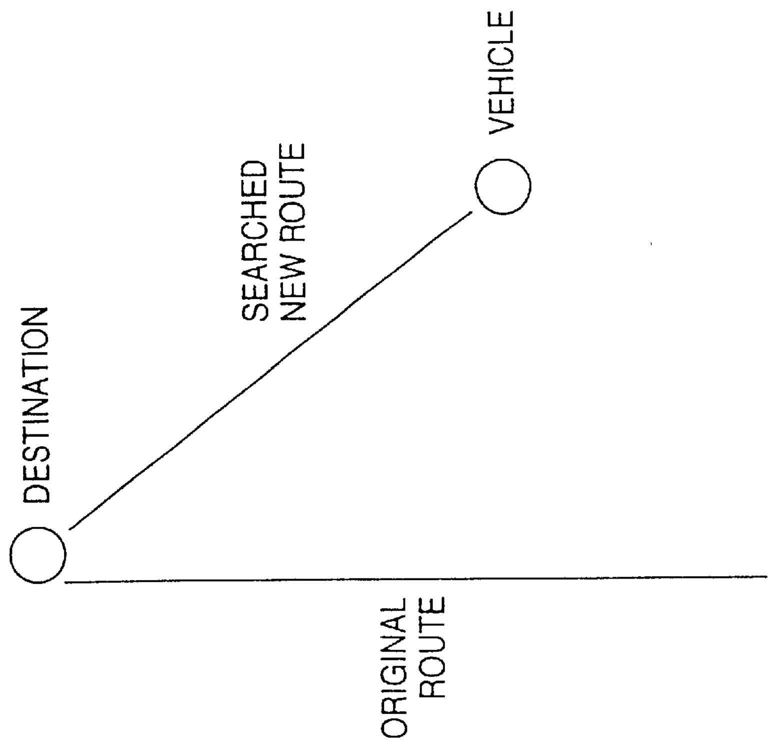
FIGS. 8A and 8B are illustrations describing correction methods for retrieving a route when a vehicle has deviated from the original route.
Figure 8B:
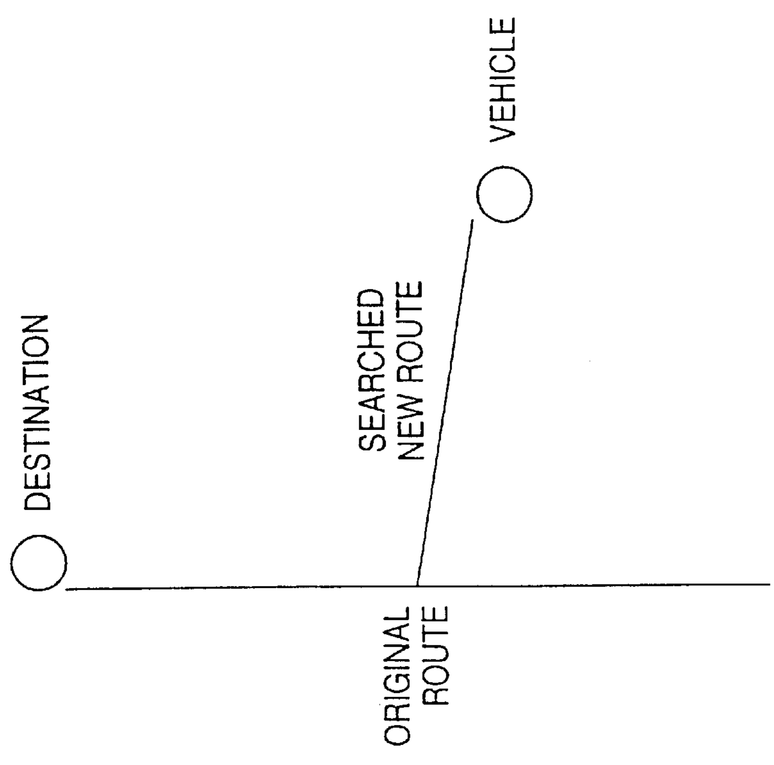
Figure 9:
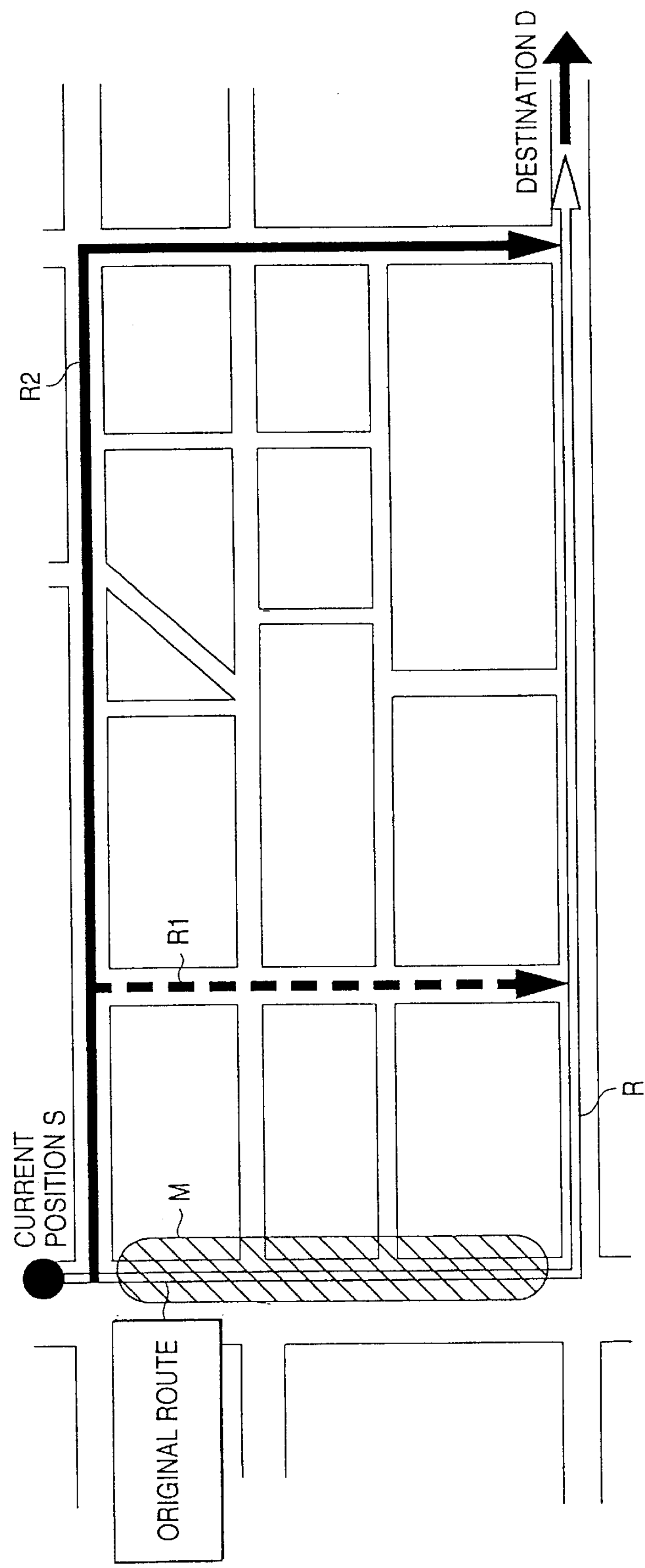
FIG. 9 is an illustration for describing retrieval of an alternative path performed by a related vehicle-mounted navigation system.

Next will be described retrieval of an alternative path when a vehicle has deviated from the original route. This retrieval is performed by the vehicle-mounted navigation system according to the second embodiment, in accordance with the flowchart shown in FIG. 6.

The route check device 25 checks whether or not the current position of the vehicle is situated along the original route (S601). The route check device 25 performs such checking operation (S601) on the basis of the information output from the current position determination section 11. If the route check device 25 detects that the vehicle has deviated from the original route, the selection device 26 determines whether to search a new route to the destination, or to return the vehicle to the original route, in accordance with the settings which have been made by the driver beforehand (S602). If search of a new route is selected, the new-route search device 27 searches for a new route interconnecting the current position to the destination (S603). If return of the vehicle to the original route is selected, the route return device 28 searches for a path which returns the vehicle from the current position to the original route (S604).

The map data generation section 15 then generates a guide screen (S605), which appears on the display section 16, displaying the route searched by the new-route search device 27, or displaying the route searched by the route return device 28. If a plurality of alternative paths have been searched, the thus-searched paths are displayed together. The driver selects one of the alternative paths (S606), whereupon guidance along a new route is commenced (S607).

As mentioned above, the vehicle-mounted navigation system according to the present embodiment enables a driver to determine whether to search for a new route interconnecting a current position to the destination, or to search for a route which returns the vehicle to the original route, in the event that the vehicle deviates from the original route. Thus, the driver can set a route in accordance with his desire.

A program for executing processing operations of the vehicle-mounted navigation system can be preserved in a recording medium, such as a computer readable medium. When the recording medium is loaded into a computer system, the previously-described processing operations of the navigation system can be embodied while the computer is controlled by execution of the program. Here, the expression "recording medium" includes, for example, a memory device, a magnetic disk drive, an optical disk drive, and a device capable of recording a program.

As has been described above, according to the present invention, the vehicle-mounted navigation system, and the recording medium having recorded thereon a processing program for use with the navigation system, enable a driver to designate a final point of a detour and to arbitrarily set an alternative path.

Since the driver can determine whether to search a new path interconnecting the final point of detour to the destination, or to return the vehicle to the original route, the driver can set a detour in accordance with his desire.

Not only in a case where a detour is made, but also in any other case where the vehicle has deviated from the original route, the driver can determine whether to search for a new path interconnecting the current position of the vehicle to the destination, or to search for a path which returns the vehicle to the original route, thus enabling driver to set a detour in accordance with his desire.

What is claimed is:

1. A vehicle-mounted navigation system which detects a current position of a vehicle, searches for a route to a set destination, and guides the vehicle along the thus-retrieved route, the system comprising:

an input device which enables a user to enter commands;

a detour request receiving device connected to said input device, wherein said detour request receiving device receives a detour request entered from the input device by the user;

a final-point-of-detour receiving device connected to the detour request receiving device, wherein said final-point-of-detour receiving device receives a final point of a segment around which the user requests to make a detour and sets the final point as a final point of detour, after having received the detour request;

an alternative path search device connected to said final-point-of-detour receiving device, wherein said alternative path search device searches for an alternative path interconnecting the current position of the vehicle to the final point of detour, after having received the final point of detour; and a detour link device which interconnects the final point of the detour to the destination, or to an original route.

2. A vehicle-mounted navigation system which detects a current position of a vehicle, searches for a route to a set destination, and guides the vehicle along the thus-retrieved route, the system comprising:

an input device which enables a user to enter commands;

a detour request receiving device connected to said input device, wherein said detour request receiving device receives a detour request entered from the input device by the user;

a final-point-of-detour receiving device connected to the detour request receiving device, wherein said final-point-of-detour receiving device receives a final point of a segment around which the user requests to make a detour and sets the final point as a final point of detour, after having received the detour request;

an alternative path search device connected to said final-point-of detour receiving device, wherein said alternative path search device searches for an alternative path interconnecting the current position of the vehicle to the final point of detour, after having received the final point of detour; and a detour link device which interconnects the final point of the detour to the destination, or to an original route, the detour link device including:

a detour check device which, by comparison, checks whether or not a match exists between the final point of detour and the original route;

a selection device which, when the detour check device has detected no match, determines whether to search for a new route interconnecting the final point of detour to the destination, or to search for a path which returns the vehicle to the original route, in accordance with settings made by the user;

a new-route search device which, when the selection device has selected to search for a new route to the destination, searches for a new route interconnecting the final point of detour to the destination; and a route return device which, when the selection device has selected return of the vehicle to the original route, searches for a route that returns the vehicle from the final point of detour to the original route.

3. A vehicle-mounted navigation system which detects a current position of a vehicle, searches for a route to a set destination, and guides the vehicle along the thus-retrieved route, the system comprising:

a detour check device which, by comparison, checks whether or not a match exists between a final point of detour and the original route;

a selection device which, when the detour check device has detected no match, determines whether to search for a new route interconnecting the final point of detour to the destination, or to search for a path which returns the vehicle to the original route, in accordance with settings made by a user;

a new-route search device which, when the selection device has selected to search for a new route to the destination, searches for a new route interconnecting the final point of detour to the destination; and a route return device which, when the selection device has selected return of the vehicle to the original route, searches for a route that returns the vehicle from the final point of detour to the original route.

4. A computer readable medium having recorded vehicle-mounted navigation system which detects a current position of a vehicle, searches for a route to a set destination, and guides the vehicle along the thus-retrieved route, the processing program comprising:

a detour request receiving operation for receiving a detour request entered by a user;

a final-point-of-detour receiving operation which receives, from the detour request receiving operation, a final point of a segment around which the user requests to make a detour, and which sets the final point as a final point of detour;

an alternative path search operation which receives the final point of detour from the final-point-of-detour receiving operation, and which searches for an alternative path interconnecting the current position of the vehicle to the final point of detour, after having received the final point of detour; and a detour link operation which interconnects the final point of detour to the destination, or to an original route.

5. A computer readable medium having recorded thereon a processing program for use with a vehicle-mounted navigation system which detects a current position of a vehicle, searches for a route to a set destination, and guides the vehicle along the thus-retrieved route, the processing program comprising:

a detour request receiving operation for receiving a detour request entered by a user;

a final-point-of-detour receiving operation which receives, from the detour request receiving operation, a final point of a segment around which the user requests to make a detour, and which sets the final point as a final point of detour;

an alternative path search operation which receives the final point of detour from the final-point-of-detour receiving operation, and which searches for an alternative path interconnecting the current position of the vehicle to the final point of detour, after having received the final point of detour; and a detour link operation which interconnects the final point of detour to the destination, or to an original route, the detour link operation comprising:

a detour check operation which, by comparison, checks whether or not a match exists between the final point of detour and the original route;

a selection operation which, when the route check operation has detected no match, determines whether to search for a new route interconnecting the final point of detour to the destination, or to search for a route which returns the vehicle to the original route, in accordance with settings made by the user;

a new-route search operation which, when the selection operation has determined to search for a new route to the destination, searches for a new route interconnecting the final point of detour to the destination; and a route return operation which, when the selection operation has selected return of the vehicle to the original route, searches for a route that returns the vehicle from the final point of detour to the original route.

6. A computer readable medium having recorded thereon a processing program for use with a vehicle-mounted navigation system which detects a current position of a vehicle, searches for a route to a set destination, and guides the vehicle along the thus-retrieved route, the processing program a detour check operation which, by comparison, checks whether or not a match exists between a final point of detour and the original route;

a selection operation which, when the route check operation has detected no match, determines whether to search for a new route interconnecting the final point of detour to the destination, or to search for a route which returns the vehicle to the original route, in accordance with settings made by a user;

a new-route search operation which, when the selection operation has determined to search for a new route to the destination, searches for a new route interconnecting the final point of detour to the destination; and a route return operation which, when the selection operation has selected return of the vehicle to the original route, searches for a route that returns the vehicle from the final point of detour to the original route.

* * * * *